United States Patent Office 3,151,183
Patented Sept. 29, 1964

3,151,183
FLAME RESISTANT COPOLYMER OF AN ESTER OF A 2,3-DIHALOALKANOL AND AN UNSATURATED POLYCARBOXYLIC ACID
John C. Bill, Middlebury, and Roger W. Amidon, Woodbury, Conn., assignors to United States Rubber Company, New York, N.Y., a corporation of New Jersey
No Drawing. Filed Jan. 18, 1960, Ser. No. 2,849
21 Claims. (Cl. 260—869)

This invention relates to the preparation of new flame resistant resins, and to the resins made thereby. More particularly, it relates to the use of the esters of halogen containing alcohols, in which the carbinol group is characterized by being halogen free, and alpha, beta-unsaturated polycarboxylic acids in preparing flame resistant resins by copolymerizing such esters with copolymerizable monomer in the presence of a free radical initiator.

The need for flame resistant polyester resin compositions has become acute in recent years. A commentary on this need is set forth by R. Parkyn in British Plastics, 29–34 (January 1959), in an article entitled, "Self Extinguishing Polyester Resins."

Therefore, it is an object of our invention to provide a flame resistant resin that is easily prepared and relatively inexpensive.

It is a further object of our invention to provide an improved resinous composition that is light stable as well as flame resistant. These and other objects will be apparent from a reading of the specificaion hereinafter set forth.

We have found that flame resistant resins, which in many instances are light stable, may be prepared by incorporating esters of halogen containing alcohols, in which the carbinol group is characterized by being halogen free and the halogen substituent is bromine, chlorine or fluorine, and alpha, beta unsaturated polycarboxylic acids in copolymerizable materials such as polyester resins, styrene and other vinyl substituted compounds and to converting these to polymeric material by the use of free radical initiators. The resulting products are very reluctant to burn, as shown by attempting to burn the resulting copolymer in an open flame.

The synthesis of the halogen containing esters may be carried out in several ways. First of all the halogen containing alcohol may be reacted with an appropriate acid or its anhydride, or the ester of such acid. For example, the reactions of dihalopropanol may be represented by the following equations:

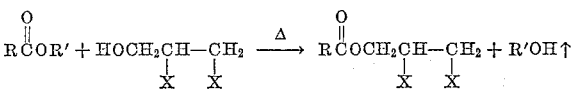

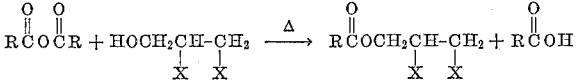

R=unsaturated group; R'=hydrogen or alkyl; and X=halogen atom.

The syntheses of these esters may also be accomplished by the addition of halogens to the corresponding type allyl ester;

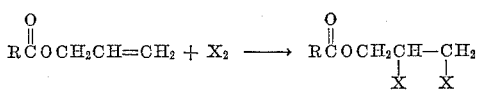

In these esters it has been shown that the halogenation occurs on the allyl double bond almost exclusively, thereby leaving the esters with unsaturation sensitive to free radicals. This characteristic permits their copolymerization with vinyl substituted compounds. In the case of the bromination product of diallyl fumarate, the infrared spectrum shows all the standard bands of the fumarate ester family, such bands being described by Walton and Hughes in Anal. Chem., 28, 1388 (1956), and by the same authors in J.A.C.S., 79, 3985–92 (1957). Those bands of special interest are at 12.92 microns, probably due to the out-of-plane deformation at the ester carbon atom, as well as those at 7.7, 7.9, 8.6, 10.18 and 15.0 microns. Strong bands are noted at 5.8 microns, due to the carbonyl stretching, and at 6.08 microns, due to the trans carbon-carbon double bond, which support the fumarate structure of the product.

The structures of the halogen containing esters were supported further by correct halogen analyses, by additional infrared spectra of the bis (2,3-dibromopropyl) itaconate, and the bis (2,3-dichloropropyl) fumarate.

Any halogen containing alcohol, whether the halogen is attached thereto prior to or after esterification by reaction with the alpha, beta unsaturated carboxylic acid, is within the scope of our invention. An exception to these operative alcohols is where the halogen substitution is on the same carbon as the hydroxyl group. Consequently, the carbinol group

must be halogen free. Typical operative alcohols are the following bromine containing alcohols and their chlorine and fluorine containing counterparts:

2,3-dibromobutanol-1
3,4-dibromobutanol-1
2,3-dibromo-3-methyl-butanol-1
1,2-dibromopentanol-3
1,3-dibromopropanol-2
5,6-dibromohexanaol-1
1,2-dibromoheptanol-3
1,7-dibromoheptanol-4
2,3-dibromooctanol-8
3-ethyl-5,6-dibromohexanol-3
3-methyl-2,3-dibromoheptanol-7
3-methyl-6,7-dibromooctanol-1
2,3,7-trimethyl-6,7-dibromooctanol-1
10,11-dibromoundecanol-1
1,2-dibromodecanol-3
9,10-dibromooctadecanol-1
9,10,12,13,15,16-hexabromooctadecanol-1
2,3-dibromobutanediol-1,4
3,4-dibromobutanediol-1,2
1,2-dibromopentanediol-3,4
2,3-dibromopentanediol-1,4

Other suitable reactants are those where the alcohol is cyclic, such as 2,3-dibromocyclohexanol.

Examples of operative aromatic substituted alcohols are:

3-phenyl-2,3-dibromopropanol
2,4,6-tribromophenoxyethanol
pentabromophenoxyethanol Although chlorinated and brominated alcohols and their corresponding esters are of particular importance in our invention, such invention is not limited thereto. Fluorinated compounds are more expensive to prepare or purchase but are also effective as a flame retardant. Iodinated compounds are better as flame retardants than the others but generally are not operative herein because iodine is frequently released as a free element during the cure of the flame resistant resin within which it has been incorporated, thereby interfering with said cure.

The alpha, beta unsaturated carboxylic acids which are esterified with the halogen containing alcohols, or the non-halogen containing counterparts of such alcohols prior to halogenation, are poly basic in reactivity, such as fumaric, maleic, itaconic, and aconitic, or their anhydrides where such exist.

The flame resistant resinous compositions of our invention are prepared by copolymerizing the ester of halogen containing alcohol and an alpha, beta unsaturated polycarboxylic acid with copolymerizable monomers containing $CH_2=C<$ group, such as styrene, or mixtures thereof, or a mixture of such monomers with unsaturated polyester resin, such as the unsaturated alkyds and copolymerizable mixtures of unsaturated alkyds and reactive monomers suggested by Ellis in U.S. Patents Nos. 2,255,313 and 2,195,362 and Parker in U.S. Patents Nos. 2,593,787 and 2,740,765. Copolymerization is effected in the presence of a free radical initiator or generator such as organic peroxides, and including hydroperoxides, and ionizing radiation (by which term we mean to include electromagnetic and material radiations such as ultraviolet light, x-radiation, gamma radiation, electron radiation, and alpha and beta particles from various material sources such as radioactive cobalt). The peroxidic initiators are employed in amounts of from 0.1% to 15%, and usually from 0.1% to 10% by weight of the copolymerizable mixture. Some of the resulting resinous compositions have improved light stability in addition to their flame retarding properties.

The following experiments and data illustrate but do not limit our invention.

TABLE I

*Bromine Analyses of Halogen Containing Monomers*

| Compounds | Theoretical | Found |
|---|---|---|
| Bis (2,3-dibromopropyl) fumarate (A) | 61.9 | 62.12 |
| Bis (2,3-dibromopropyl) fumarate (B) | 61.9 | 61.2 (3) |
| Bis (2,3-dibromopropyl) maleate | 61.9 | 61.08 |
| Bis (2,3-dibromopropyl) carbate [1] | 55.02 | 55.54 |
| Bis (2,3-dibromopropyl) itaconate | 60.5 | 60.81 |
| Tris (2,3-dibromopropyl) aconitate | 62.1 | 59.3 |

[1] Bis (2,3-dibromopropyl) bicyclo [2,2,1] 5-heptene-2,3-dicarboxylate.

(3) A material was made by Golendeev, using an identical procedure and having an identical melting point. J. Gen. Chem (U.S.S.R.) 10, 1408-14 (1940); C.A., 35, 36078 (1941); No proof of structure was given.

It was also discovered that the crystalline bis (2,3-dibromopropyl) fumarate could be made by the bromination of diallyl maleate, providing diethyl ether was used as the solvent (see Example 2B). When cyclohexane was used as the solvent the primary product was the maleate ester (see Example 2A). Proof of isomerization was shown by a "mixed melting point" with a known sample of bis (2,3-dibromopropyl) fumarate. Infrared curves also showed fumarate bands, rather than maleate bands.

EXAMPLES OF THE PREPARATION OF HALOGEN CONTAINING MONOMERS (1.A) *Bis (2,3-Dibromopropyl) Fumarate.*—Fumaric acid (100 g., .862 mole) 2,3-dibromopropanol (377 g., 1.73 moles), benzene (150 g.) and sulfuric acid (2.3 g.) were heated at reflux temperature for six hours in a flask equipped with a Stark and Dean trap. The benzene layer was then washed with 1.5 N sodium hydroxide and twice with water. The benzene solution was dried with anhydrous sodium sulfate and the benzene distilled. The resulting product was recrystallized from cyclohexane; M.P. 65–6° C. Percent bromine: theor. 61.9. Found 62.12.

(1.B) *Bis (2,3-Dibromopropyl) Fumarate.*—Diallyl fumarate (392 g., 2.0 moles) was dissolved in diethyl ether (500 ml.) in a 1-1.3 necked flask, equipped with pot thermometer, reflux condenser, stirrer, and addition funnel. The solution was cooled to 5° C. and bromine (640 g., 4.0 moles) added at such a rate that the pot temperature never exceeded 25° C. A white crystalline solid separated out and was recrystallized from diethyl ether; M.P. 65–66° C. Percent bromine: theor. 61.9. Found 61.2.

(2.A) *Bis (2,3-Dibromopropyl) Maleate.*—The same apparatus was used as that in 1.B. Diallyl maleate (147 g., .75 mole) was dissolved in chloroform or cyclohexane (150 ml.). This was cooled to 5–10° C. and bromine (240 g., 1.5 moles) was added dropwise. The pot temperature was kept below 30° C. by cooling. Further addition of cyclohexane (300 ml.) was made. The product separated as a viscous oil. Final traces of solvent were removed by vacuum distillation. Percent bromine: theor. 61.9. Found 61.08.

(2.B) *Bis (2,3-Dibromopropyl) Fumarate.*—Diallyl maleate (98 g., 0.5 mole) was placed in a 500-ml. 3-necked flask, equipped with a pot thermometer, a condenser, a stirrer, and an addition funnel, and diethyl ether (250 ml.) was added. This was cooled to 10° C. and bromine (160 g., 1 mole) was added dropwise and the temperature maintained below 20° C. The solvent was then distilled, the last traces being removed under vacuum. On standing overnight the liquid residue had crystallized into a white solid. A small sample was recrystallized twice from methanol; M.P. 66–67° C. A "mixed melting point" was taken with another sample of bis (2,3-dibromopropyl) fumarate, M.P. 66–67° C.

(3) *Bis (2,3-Dibromopropyl) Carbate.*—The same type of apparatus was used as that used in 1.B. Diallyl carbate (150 g., .573 mole) was dissolved in cyclohexane (300 ml.) and cooled to 10° C. Bromine (183.5 g., 1.148 moles) was added dropwise and the temperature held below 25° C., by cooling. Separation into two layers occurred and the heavier portion was subjected to distillation for solvent removal. Final traces were distilled under vacuum. Percent bromine: theor. 55.02. Found 55.54.

(4) *Bis (2,3-Dibromopropyl) Itaconate.*—The same type of apparatus was used as that described in 1.B. Diallyl itaconate (100 g., .477 mole) was dissolved in chloroform (100 ml.) and cooled to 5° C. Bromine (153 g., .954 mole) was added at such a rate that the temperature did not exceed 30° C. After all the bromine was added the chloroform was removed by vacuum distillation. The final product was a light colored liquid. Percent bromine: theor. 60.5. Found 60.81.

(5) *Tris (2,3-Dibromopropyl) Aconitate.*—The same type of apparatus was used as that described in the previous example. Triallyl aconitate (80 g., .259 mole) was dissolved in diethyl ether (125 ml.) cooled to 5° C. and the bromine (124.5 g., .727 mole) added dropwise. The temperature was kept below 25° C. by cooling. The ether solution was then passed through a column (1" by 10½") of activated alumina. A purified portion was placed under vacuum and the solvent removed. The resulting product was a light yellow liquid. Percent bromine: theor. 62.1. Found 59.3.

(6) *Bis (2,3-Dichloropropyl) Fumarate.*—Diallyl fumarate (96 g., .49 mole) and chloroform (506 gms.) were charged to a 1–1, 3-necked flask equipped with a gas inlet tube reaching below the surface of the liquid, a stirrer, a pot thermometer and reflux condenser. A cylinder of chlorine was attached through a trap to the gas inlet line. All tubing, through which chlorine would pass, was either glass or Nalgon. A Dry Ice trap was connected to the condenser, so that any condensable gas would be trapped. Chlorine gas was bubbled in at such a rate that the temperature remained between 55–65° C. When the reaction mixture had taken up 72 g. (1.015 moles) chlorination was discontinued. The chloroform was distilled at atmospheric pressure. The last traces were distilled under vacuum (8 mm.) to a temperature of 80° C. The product was a light colored liquid. Percent chlorine: theor. 42.1. Found 46.28.

(7) *2,3-Dibromopropyl Hydrogen Fumarate.*—A mixture of 2,3-dibromopropanol (72.6 g., .333 mole) and maleic anhydride (36.2 g., .369 mole) was placed in a bath (50° C.). The anhydride dissolved to give a clear solution which gradually thickened as crystals formed.

After twenty hours a solid crystalline mass was obtained. This could be recrystallized from a large volume of water or from a mixture of methyl ethyl ketone and hexane. The product was a white crystalline solid (needles, M.P. 101–2° C.). Neutralization equivalent: theor. for $C_7H_8O_4Br_2$, 316. Found 317.

The halogenated monomers previously described may be copolymerized with different polyester resins and reactive olefinically unsaturated vinylic monomeric compounds, such as styrene and its homologues including methyl styrene, divinyl benzene, indene, esters such as vinyl acetate, vinyl chloride, acrylonitrile, acrylates such as methyl methacrylate, methyl acrylate, allyl acetate, and esters of dicarboxylic acids and allyl alcohols. Any one or mixtures of two or more of these monomers may be employed. Copolymerization of the halogenated ester with the $CH_2=C<$ containing monomer, or a mixture of such monomer with unsaturated polyester resin is generally effected at temperatures of from about 25° C. to about 125° C. in the presence of a free radical initiator for times sufficient to effect sufficient reaction, such times ordinarily being in the range of from a few minutes to several hundred hours.

The halogenated monomers were first evaluated in polyester resins such as polyethylene (maleate-phthalate)-styrene resins. These resins were catalyzed with benzoyl peroxide (1%) and cured overnight at 50° C., .5 hr. at 70° C. and 1.5 hrs. at 110° C. This gave fine clear castings in all cases. When the materials were tested for their self-extinguishing properties, a sample (4" by .5" by ⅛") was fixed in a vertical position. This was ignited by a 1-inch Bunsen flame for 15 sec., the flame removed, and the time required (seconds) for the sample to stop burning was recorded. As soon as the flame disappeared the procedure was repeated a second and a third time (ignition time, 5 seconds). The results, along with other physical properties, are given in Table II. The resin used in these experiments was prepared according to Example 8.

(8) *Examples of Thermosetting Copolymers of Bis (2,3-dibromopropyl) Fumarate.*—Maleic anhydride (980 g., 10 moles), phthalic anhydride (1480 g., 10 moles) and ethylene glycol (1305 g., 21 moles) were charged to a 5-liter 3-necked flask equipped with a gas inlet tube, stirrer, pot thermometer and a Stark and Dean trap with condenser. The system was then purged with carbon dioxide and the heat was applied along with stirring. Water was removed and the temperature was kept at 200–210° C. When the alkyd had reached an acid number (mg. KOH to neutralize 1 gm. of sample) of 50–60, the formed alkyd was cooled to 145° C. and hydroquinone (.692 g., 150 p.p.m.) was added. On cooling to 115° C., styrene (1155 g.), which contained copper naphthenate dissolved in it in such quantity as to give the finished resin 2 p.p.m. of cooper, was added. To this resin (3314 g.) dimethyl hydrogen phosphite (36 g.) and a light stabilizer such as p-methoxy-o-hydroxybenzophenone (9.9 g.) were added. Finally a flame resistant monomer, such as bis (2,3-dibromopropyl) fumarate (640 g.), was dissolved in the resin. Stirring was continued under a blanket of carbon dioxide at a pot temperature of 60–65° C. for 30 minutes. This resin was converted to a casting as mentioned earlier in discussion and tested.

TABLE II

*Thermoset Flame Resistant Polymers*

| Monomer | Flame Test | Physical Test Data | | | | | |
| --- | --- | --- | --- | --- | --- | --- | --- |
| | | Tensile, p.s.i. | Flex Strength, p.s.i. | Heat Dist., °C. | Percent Elong. | Flex. Mod., p.s.i. | Hardness Rockwell L |
| 1. Bis (2,3-Dibromopropyl) fumarate | 1 Light 1 sec<br>2 Light 1 sec<br>3 Light 3 sec | 9,850 | 18,500 | 53 | 4.73 | $4.9 \times 10^5$ | 117 |
| 2. Bis (2,3-Dibromopropyl) maleate | 1 Light 1 sec<br>2 Light 2 sec<br>3 Light 4 sec | 7,090 | 15,200 | 46 | 5.5 | $3.35 \times 10^5$ | 109 |
| 3. Bis (2,3-Dibromopropyl) itaconate | 1 Light 1 sec<br>2 Light 3 sec<br>3 Light 5 sec | 5,780 | 15,540 | 39 | 2.9 | $3.4 \times 10^5$ | 109 |
| 4. Tris (2,3-Dibromopropyl) aconitate | 1 Light 1 sec<br>2 Light 5 sec<br>3 Light 5 sec | 7,560 | 15,000 | 44 | 4.0 | $2.2 \times 10^5$ | 107 |
| 5. Bis (2,3-Dibromopropyl) carbate | 1 Light 1 sec<br>2 Light 5 sec<br>3 Light 15 sec | 5,330 | 13,720 | 52 | 9.8 | $2.6 \times 10^5$ | 106 |
| 6. Blank | 1 Light ∞ sec | 6,000 | 19,000 | 59 | 1.2 | $5.6 \times 10^5$ | 119 |

TABLE III

*Thermoset Flame Resistant Polymer*

| | | | | | | | |
| --- | --- | --- | --- | --- | --- | --- | --- |
| Bis (2,3-Dibromopropyl) fumarate | 1 Light 1 sec<br>2 Light 3 sec<br>3 Light 30 sec | 5,780 | 12,120 | 45 | 11.0 | $2.7 \times 10^5$ | 97 |

Other types of resin such as the following (Example 9) were tested.

(9) The same type of apparatus was used as in Example 8. The alkyd was made by reacting diethylene glycol (1.98 moles), ethylene glycol (.64 mole), phthalic anhydride (1.00 mole) and maleic anhydride (1.5 moles) to an acid number of 30–40. The heat was maintained at 205–210° C. then the alkyd was allowed to cool to 110° C. and hydroquinone (125 p.p.m.) added. At 100° styrene (33.5%), which contained copper, naphthenate based on 1 p.p.m. of copper in the final resin, was added. To this resin were added:

(a) dimethyl hydrogen phosphite (.9%).

(b) light stabilizer such as p-methoxy-o-hydroxybenzophenone (.25%).

(c) flame resisting monomer such as bis (2,3-dibromopropyl) fumarate (16%).

This resin was converted to a solid casting by a standard procedure. Test results of the cured casting are given in Table III.

EXAMPLES OF THERMOPLASTIC POLYMERS

Halogenated unsaturated esters were also copolymerized with styrene. The resulting copolymers were shown to be flame resistant.

(10) *Copolymer of Bis (2,3-Dibromopropyl) Fumarate and Styrene.*—Bis (2,3-dibromopropyl) fumarate (80 g., .155 m.) and styrene (20 g., .193 m.) were charged to a 1–1, 3-necked flask equipped with a Teflon stirrer, pot thermometer and 10 inch reflux condenser. Benzene (380 gms.) were added and the material brought to reflux temperature (81° C.). Benzoyl peroxide (1 gm.) was dissolved in benzene (20 gms.) and added to the hot solution. This was heated at reflux temperature for two hours and a second "hot shot" of benzoyl peroxide (1 g.), dissolved in benzene (10 gms.), was added. Heating at reflux temperature was continued overnight. A sample (50 ml., 49 g.) was removed and added to methanol (500 ml.) in a high speed, high shear mixer. A white solid (8.58 g., 99.9%) separated. This was removed by filtration and redissolved in benzene (50 ml.) followed by reprecipitation for methanol. When dried the sample fused at 86° C. This was placed on a porcelain spatula and held in a 1-inch Bunsen flame. The copolymer did not burn when removed from the flame. Other samples have been made by this same method, but with varying amount of flame retardant character. See Table IV.

TABLE IV
Thermoplastic Flame Resistant Polymers

| Monomer | Parts Additive | Parts Styrene | Flame Test | Percent Br | Fusion Temp., °C. |
|---|---|---|---|---|---|
| None | 0 | 100 | Burned | | |
| Bis(2,3-Dibromo- propyl) fumarate. | 80 | 20 | <1 sec | 45.27 | 86 |
| | 20 | 80 | <1 sec | 21.2 | 114 |
| Tris(2,3-Dibromo- propyl) aconitate. | 20 | 80 | 1 sec | 19.5 | 105 |
| Bis(2,3-Dibromo- propyl) itaconate. | 16 | 84 | 2 sec | 13.67 | 97 |
| Bis(2,3-Dichloro- propyl) fumarate. | 40 | 60 | 7 sec | [1] 16.26 | 112 |

[1] Percent chlorine.

(11) *Copolymer of 2,3-Dibromopropyl Hydrogen Fumarate and Styrene:*

| Charge | Parts A | Parts B |
|---|---|---|
| Water | 300 | 300 |
| Styrene | 90 | 85 |
| 2,3-Dibromopropyl Hydrogen Fumarate | 10 | 15 |
| Nacconol NRSF [1] | 3 | 3 |
| Tamol N [2] | 3 | 3 |
| Potassium Persulfate | 0.3 | 0.3 |
| Mixed Tertiary Mercaptans | 1.5 | 2.0 |

[1] Sodium alkyl aryl sulfonate.
[2] Sodium salt of condensed sulfonic acid.

A. The materials, when agitated 5½ hours at 50° C., gave 25.4% solids. The latex flocced in calcium chloride (5%) gave a copolymer containing 14.3% 2,3-dibromopropyl hydrogen fumarate.

B. The materials, when agitated four hours at 50° C., gave 18.7% solids. The latex flocced in calcium chloride (5%) gave a copolymer containing 18.8% 2,3-dibromopropyl hydrogen fumarate.

Further work has been done on the emulsion copolymerization of halogen containing monomers with vinyl acetate. Terpolymers were also formed with acrylonitrile and styrene. Aqueous latices were obtained that gave flame resistant films when dried.

(12) *Copolymers of Bis (2,3-Dibromopropyl) Fumarate and Vinyl Acetate.*—Bis (2,3-dibromopropyl) fumarate (20 pts., 100 g.), vinyl acetate (80 pts., 400 g.) and Pluronic F–68 ([1] 5 pts., 25 g.) were mixed together. Water (80 pts., 400 g.), potassium persulfate (.4 pt., 2.0 g.) and sodium hydroxide (.25 pt., 1.25 g.), along with 10% of the monomer mixture was charged to the polymerization apparatus and brought to 70° C. The rest of the monomer mixture was added over three hours at this temperature. The aqueous mixture was heated under these conditions until 53.2% solids were obtained.

[1] A condensate of ethylene oxide with a hydrophobic base formed by condensing propylene oxide with propylene glycol.

A film of the copolymer was obtained by spreading the dispersion on a glass plate and allowing it to dry overnight at room temperature. The film did not continue to burn when it was removed from an open flame.

(13) *Terpolymer of 2,3-Dibromopropyl Hydrogen Fumarate, Acrylonitrile and Styrene.*

Charge:
| | |
|---|---|
| Water | 300 |
| Styrene | 55 |
| 2,3-dibromopropyl hydrogen fumarate | 25 |
| Acrylonitrile | 20 |
| Nacconol NRSF | 3 |
| Tamol N | 3 |
| Potassium persulfate | 0.3 |
| Mixed tertiary mercaptans | 0.2 |

2,3-dibromopropyl hydrogen fumarate (5 pts.) was added to water. The remaining monomers plus mixed tertiary mercaptans were added during a three hour period, at 60° C. and under a nitrogen blanket. After five hours agitation, the solids were 20.6%. The polymer contained 16.6% acrylonitrile and 27% 2,3-dibromopropyl hydrogen fumarate. Bromine, found 13.7%

Since this invention embraces the use of a copolymerizable monomer in a resinous system which retards burning of the fully cured or polymerized resin, no limitation is placed on the relationship of the other component or components in the resin system so long as they enter into an essentially completed copolymerization of components. Although a homogeneous resin is desirable, it is possible to obtain a combination of styrene-unsaturated polyester-halogenated monomer which is not homogeneous at ambient temperature, but which will enter into a single phase system at higher temperatures.

It is well known in the art certain polyesters may dissolve a limited amount of copolymerizable monomer such as styrene. An attempt to exceed this limit results in phase separation. For example, a polyethylene (maleate-phthalate) polyester will dissolve about a maximum of 35 to 45 parts of styrene per hundred of polyester and in such cases it would be inadvisable to exceed this limit to provide a commercially acceptable product.

Suitable polyesters for use in this invention may be made which do not have such limited styrene or monomer compatibility. These may be prepared, for example, by using propylene glycol in place of ethylene glycol. Other means of imparting improved solubility of the polyester in hydrocarbon monomers may be used, e.g., using a dibasic anhydride (or the derived acid) such as that obtained by the Diels-Alder reaction of maleic anhydride and cyclopentadiene. It is obvious to those skilled in the art that such polyester modifications would allow the use of more styrene or other monomeric material in the polyester resin. Physical properties of cured products obtained therefrom would accordingly be altered usually to a state of higher cross-link density such as reflected in modulus or heat distortion temperature.

We can sell the halogenated ester to the user who may blend it with the copolymerizable vinyl monomers, or a mixture of such monomers and alkyd resin or we can sell the uncured liquid copolymerizable composition of halogenated ester in monomer or mixtures of monomer and alkyd resin. In such cases, of course, the user adds the necessary free radical initiator.

Having thus described our invention, what we claim and desire to protect by Letters Patent is:

1. A copolymerizable composition comprising (1) a monomeric ester of an alcohol selected from the group consisting of 2,3-dibromopropanol and 2,3-dichloropropanol, and an acid selected from the group consisting of alpha, beta unsaturated polycarboxylic acids and their anhydrides and (2) a reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

2. A copolymerizable composition comprising (1) bis (2,3-dichloropropyl) fumarate and (2) a reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

3. A copolymerizable composition comprising (1) tris (2,3-dibromopropyl) aconitate and (2) a reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

4. A copolymerizable composition comprising (1) bis (2,3-dibromopropyl) itaconate and (2) a reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

5. A copolymerizable composition comprising (1) (2,3-dibromopropyl)hydrogen fumarate and (2) a reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

6. A copolymerizable composition comprising (1) bis (2,3-dibromopropyl) fumarate and (2) a halogen-free reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

7. A copolymerizable composition as in claim 6, wherein the reactive substance (2) is styrene.

8. A copolymerizable composition as in claim 6, wherein the reactive substance (2) is a mixture of styrene with said unsaturated polyester resin.

9. A flame resistant resinous composition comprising (1) a monomeric ester of an alcohol selected from the group consisting of 2,3-dibromopropanol and 2,3-dichloropropanol, and an acid selected from the group consisting of alpha, beta unsaturated polycarboxylic acids and their anhydrides copolymerized with (2) a reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

10. A flame resistant resinous composition comprising (1) bis(2,3-dichloropropyl) fumarate copolymerized with (2) a reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

11. A flame resistant resinous composition comprising (1) tris(2,3-dibromopropyl) aconitate copolymerized with (2) a reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

12. A flame resistant resinous composition comprising (1) bis(2,3-dibromopropyl) itaconate copolymerized with (2) a reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

13. A flame resistant resinous composition comprising (1) 2,3-dibromopropyl hydrogen fumarate copolymerized with (2) a reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

14. A flame resistant resinous composition comprising (1) bis(2,3-dibromopropyl) fumarate copolymerized with (2) a halogen-free reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

15. A flame resistant resinous composition as in claim 14, wherein the reactive substance (2) is styrene.

16. A flame resistant resinous composition as in claim 14, wherein the reactive substance (2) is a mixture of styrene with said unsaturated polyester resin.

17. The process of making flame resistant resinous compositions comprising copolymerizing in the presence of a free radical initiator (1) a monomeric ester of an alcohol selected from the group consisting of 2,3-dibromopropanol and 2,3-dichloropropanol, and an acid selected from the group consisting of alpha, beta unsaturated polycarboxylic acids and their anhydrides and (2) a reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

18. The process of making flame resistant resinous compositions comprising copolymerizing in the presence of a free radical initiator (1) bis(2,3-dibromopropyl) fumarate and (2) a halogen-free reactive substance selected from the group consisting of copolymerizable monomers containing $CH_2=C<$ group and mixtures thereof, and mixtures of such monomers with unsaturated polyester resin, which resin is obtained by the reaction of a mixture comprising alpha, beta ethylenic dicarboxylic acid and polyhydric alcohol.

19. The process of making flame resistant resinous compositions as in claim 18, wherein the reactive substance (2) is styrene.

20. The process of making flame resistant resinous compositions as in claim 18, wherein the reactive substance (2) is a mixture of styrene with said unsaturated polyester resin.

21. The process of making flame resistant resinous compositions as in claim 18, wherein the reactive substance (2) is a mixture of styrene and acrylonitrile.

References Cited in the file of this patent

UNITED STATES PATENTS 2,479,486     Gerhart _____ Aug. 16, 1949

(Other references on following page)

UNITED STATES PATENTS

| | | |
|---|---|---|
| 2,594,184 | Ladd | Apr. 22, 1952 |
| 2,778,850 | Barr et al. | Jan. 22, 1957 |
| 2,819,247 | Lundberg | Jan. 7, 1958 |
| 2,902,518 | Hurdis et al. | Sept. 1, 1959 |
| 2,931,746 | Robitschek et al. | Apr. 5, 1960 |
| 3,025,279 | Barr | Mar. 13, 1962 |
| 3,053,815 | Barr | Sept. 11, 1962 |

FOREIGN PATENTS

| | | |
|---|---|---|
| 570,867 | Great Britain | July 26, 1945 |
| 540,168 | Great Britain | Oct. 8, 1941 |
| 650,144 | Great Britain | Feb. 14, 1951 |

OTHER REFERENCES

"Polyesters and Their Applications," Bjorksten et al., Reinhold Pub. Corp. (1956), page 160.